(12.) 2 Sheets--Sheet 1.

SAMUEL WILLIAMSON.

Improvement in Water Tuyeres.

No. 4,691. Reissued Jan. 2, 1872

Attest
Fl. T. Parker
Chas. W. Fisher

Inventor:
Saml Williamson

2 Sheets--Sheet 2.

SAMUEL WILLIAMSON.

Improvement in Water Tuyeres.

No. 4,691. Reissued Jan. 2, 1872.

*Attest.*
Thos. T. Fisher
Chas. W. Fisher

*Inventor.*
Sam'l Williamson

UNITED STATES PATENT OFFICE.

SAMUEL WILLIAMSON, OF CINCINNATI, OHIO.

IMPROVEMENT IN TUYERES.

Specification forming part of Letters Patent No. 118,321, dated August 9, 1871; reissue No. 4,691, dated January 2, 1872.

*To all whom it may concern:*

Be it known that I, SAMUEL WILLIAMSON, of Cincinnati, Hamilton county, Ohio, have invented certain new and useful Improvements in Water-Tuyeres, of which the following is a specification:

This is an improvement in the class of tuyeres for forges and blast-furnaces whose parts exposed to the fire are protected by a water-casing or jacket.

Figure 1:
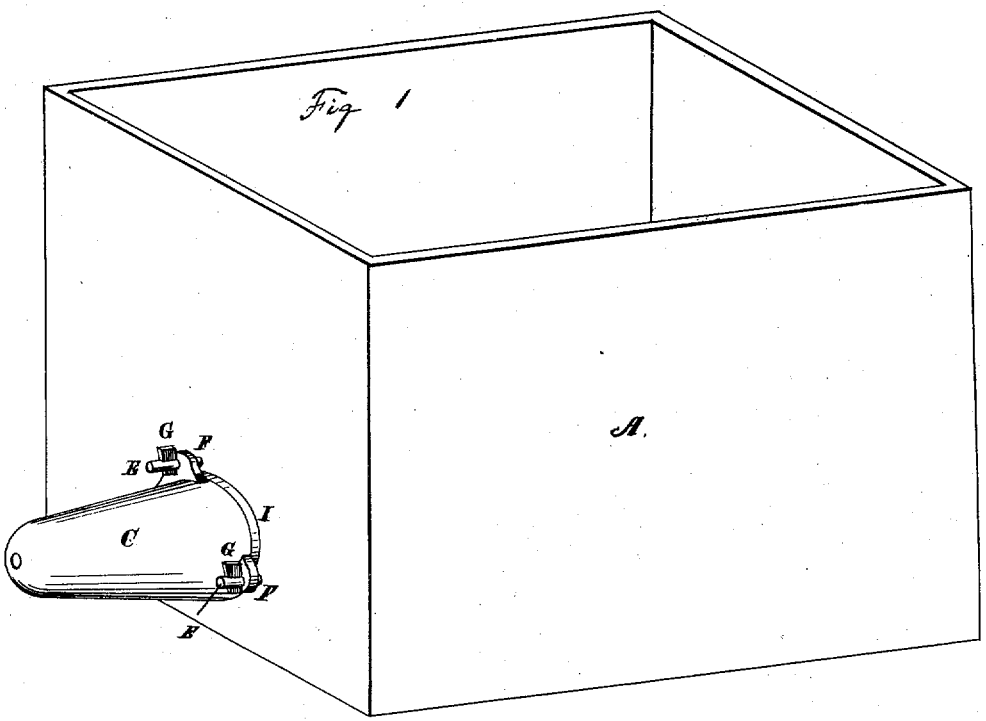
Figure 2:
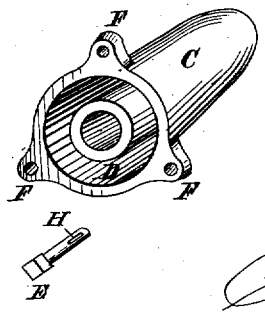
Figure 3:
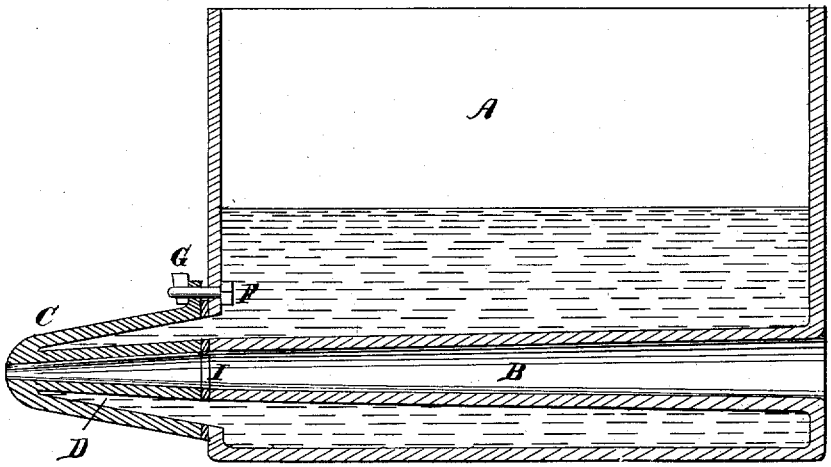
Figure 5:
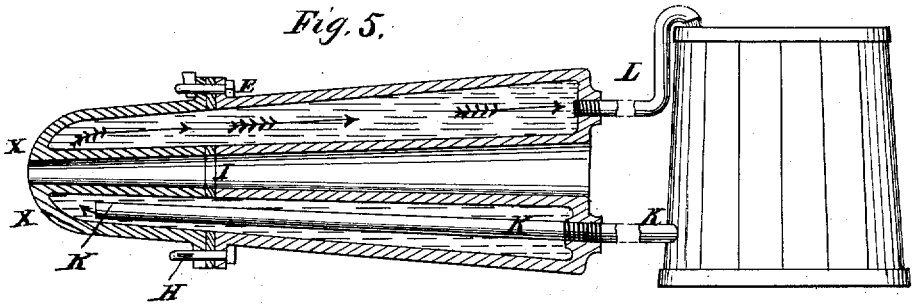
Figure 4:
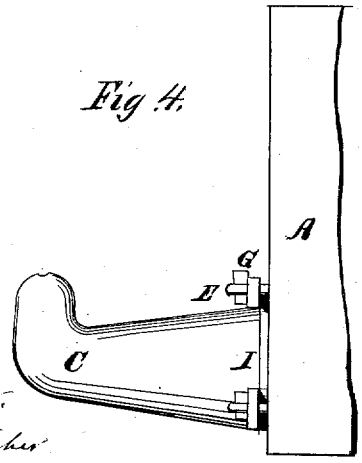

Figure 1 is a perspective view of a water-tuyere embodying my invention. Fig. 2 shows the nozzle of such tuyere detached. Fig. 3 is a vertical longitudinal section through the said tuyere. Fig. 4 shows the same tuyere-body with a different form of nozzle. Fig. 5 shows a modification of my tuyere, having an arrangement whereby the entering water is conducted to the extremity of the nozzle.

A represents the tank or box of a water-tuyere traversed by blast-pipe B that discharges into a nozzle-pipe, C, which pipe C is surrounded by a water-chamber or jacket, D, that communicates with the tank. The pipe C and jacket D constitute my nozzle, which, instead of being cast solidly to the tank or body of the tuyere, as in the customary form, consists of a separate piece or casting, as shown. This separate nozzle is united to the body by bolts E, which project from the body and through lugs F upon the nozzle, and are secured by colters G, that are driven into slots H in the bolts in the front of said lugs. A gasket, I, of gum, leather, or other suitable material, interposed between the nozzle and the tuyere-body, closes the joints and prevents leakage, either of air or water. Fig. 5 represents a tubular water-tuyere, adapted to receive its water by pipe K from a hydrant or elevated reservoir, and to discharge its heated water through another pipe, L. To this form I adapt a separate nozzle, substantially as above described. I extend the pipe K so as to conduct the cold entering water to the hottest part of the nozzle at X, and thus protect the same against injury, however intense the fire may be. On removing the nozzle the scales that accumulate in the nozzle can be easily cleaned out.

I claim herein as new and of my invention—

Jointly, the water-containing vessel A and air-tube B cast in one piece, the nozzle-piece C, also cast in one piece, and the union of said nozzle-piece with the water-containing vessel and air-tube, substantially as described.

SAML. WILLIAMSON.

Witnesses:
THOS. T. PARKER,
CHAS. H. FISHER.

(12)